United States Patent [19]

Herzl et al.

[11] Patent Number: 5,269,009
[45] Date of Patent: Dec. 7, 1993

[54] PROCESSOR SYSTEM WITH IMPROVED MEMORY TRANSFER MEANS

[75] Inventors: Robert D. Herzl, Lake Katrine; Kenneth A. Lauricella, Kingston; Linda L. Quinn, Red Hook; David A. Schroter, Wappingers Falls; Allan R. Steel, Red Hook; Joseph L. Temple, III, Hurley, all of N.Y.

[73] Assignee: International Business Machines Corporation, Armonk, N.Y.

[21] Appl. No.: 577,344

[22] Filed: Sep. 4, 1990

[51] Int. Cl.⁵ .................. G06F 12/00; G06F 13/00
[52] U.S. Cl. .................. 395/425; 364/DIG. 1; 364/243.41; 364/243.44; 364/243.45; 364/964.27; 364/964.6
[58] Field of Search .............. 395/425; 364/DIG. 1, 364/DIG. 2, 243.41, 243.44, 243.45, 964.27, 964.6

[56] References Cited

U.S. PATENT DOCUMENTS

| | | | |
|---|---|---|---|
| 3,914,747 | 10/1975 | Barnes et al. | 364/200 |
| 4,047,243 | 9/1977 | Dijkstra | 364/200 |
| 4,056,848 | 11/1977 | Gilley | 364/200 |
| 4,130,870 | 1/1978 | Schneider | 364/200 |
| 4,181,937 | 1/1980 | Hattori et al. | 364/200 |
| 4,231,088 | 10/1980 | Hammer et al. | 364/200 |
| 4,290,103 | 9/1981 | Hattori | 364/200 |
| 4,293,910 | 10/1981 | Flusche et al. | 364/200 |
| 4,394,731 | 7/1983 | Flusche et al. | 364/200 |
| 4,410,946 | 10/1983 | Spencer et al. | 364/200 |
| 4,412,303 | 10/1983 | Barnes et al. | 364/900 |
| 4,445,174 | 4/1984 | Fletcher | 364/200 |
| 4,445,176 | 4/1984 | Burk et al. | 364/200 |
| 4,476,524 | 10/1984 | Brown et al. | 364/200 |
| 4,481,576 | 9/1984 | Bicknell | 364/200 |
| 4,503,497 | 3/1985 | Krygowski et al. | 364/200 |
| 4,513,367 | 4/1985 | Chan et al. | 364/200 |
| 4,639,862 | 1/1987 | Wada et al. | 364/200 |
| 4,654,778 | 3/1987 | Chiesa et al. | 364/200 |
| 4,742,447 | 3/1988 | Duvall et al. | 364/200 |
| 4,761,737 | 8/1988 | Duvall et al. | 364/300 |
| 4,783,739 | 11/1988 | Calder | 364/200 |
| 4,797,814 | 1/1989 | Brenza | 364/200 |
| 4,821,172 | 4/1989 | Kaneko et al. | 364/200 |
| 4,839,799 | 6/1989 | Takahashi et al. | 364/200 |
| 4,843,541 | 6/1989 | Bean et al. | 364/200 |

FOREIGN PATENT DOCUMENTS

| | | |
|---|---|---|
| 156179 | 2/1985 | European Pat. Off. . |
| 61-082272 | 4/1986 | Japan . |
| 61-289444 | 12/1986 | Japan . |
| 63-80349 | 4/1988 | Japan . |
| 01-147747 | 6/1989 | Japan . |

OTHER PUBLICATIONS

IBM Technical Disclosure Bulletin-vol. 29, No. 3 Aug. 1986 Title: Avoiding Relocation by Using Extended Addressing.

Primary Examiner—Alyssa H. Bowler
Attorney, Agent, or Firm—Lynn L. Augspurger

[57] ABSTRACT

This disclosure describes an efficient method of moving data from one location in memory to another without caching the data. This includes data transfers from one main storage location to another, transfers between main and expanded storage, and transfers from one expanded storage location to another.

4 Claims, 9 Drawing Sheets

PROCESSOR SYSTEM WITH IMPROVED MEMORY TRANSFER MEANS

FIELD OF THE INVENTION

This invention relates to processor systems and more particularly to moving data form one location of memory to another without caching.

BACKGROUND OF THE INVENTION

Figure 1:
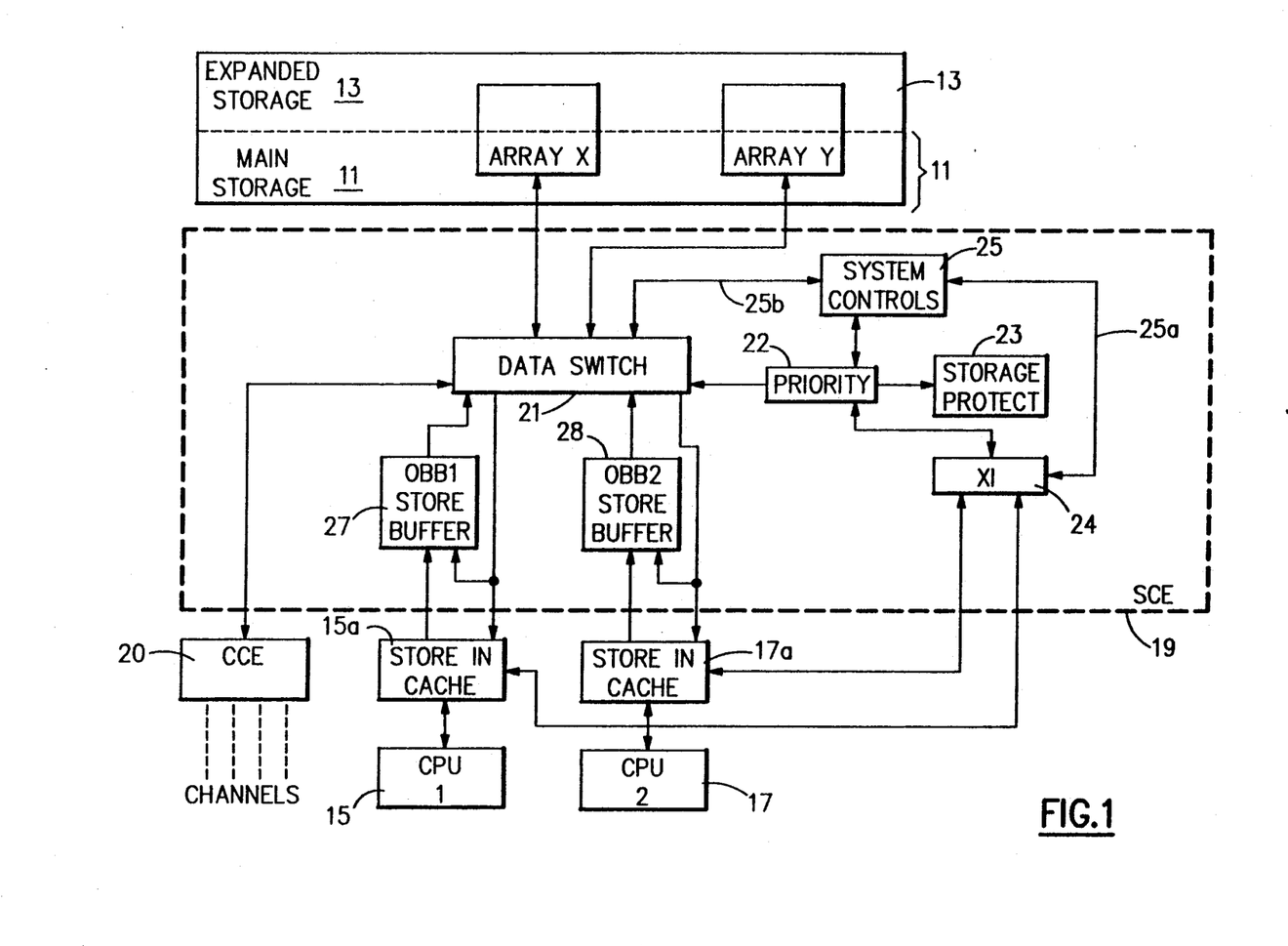
FIG. 1 is a system block diagram according to one preferred embodiment of the present invention.

FIG. 1 shows the basic configurations of a two-way multiprocessor system (MP). A detailed description is shown and described in U.S. Pat. No. 4,503,497 of Krygowski et al. entitled "System for Independent Cache-to-Cache Transfer" assigned to the same assignee as the present invention and incorporated herein by reference. Previously, if either processor instruction element (IE) wanted to move data from one location in storage to another, the data would be fetched into that processor's store-in cache. That data would then be stored back into memory. An exception to this is a paging operation in an IBM 3090 system and disclosed in Brown et al. U.S. Pat. No. 4,476,524 incorporated herein by reference. In this system, a page of data can be moved between main and expanded storage but this involves a dedicated thermal control module (TCM) to conduct the transfer. There are times when it is desired to move data from one location in storage a different location in storage without caching the data in a system like in the Krygowski et al. patent cited above. If the processor of this prior system will not be using the data being moved then caching the data can only reduce the efficiency of the storage hierarchy.

SUMMARY OF THE INVENTION

In accordance with one embodiment of the present invention an improved processor system and method is provided where the processor is of the type having a store-in cache and there is a store buffer coupled between the memory and the store-in cache. The store buffer is responsive to a processor's request for the transfer of data from one location of memory to another for storing the data between transfers without the data passing through the store-in cache.

DESCRIPTION OF THE PREFERRED EMBODIMENT

Referring to FIG. 1 there is illustrated in the system 10 according to one embodiment of the present invention wherein the main storage 11 and expanded storage 13 are part of the same physical array of storage chips X or Y. This is only one of the embodiments wherein it is desired to transfer data from one location in an array to another location or from one array to another. Large density memory chips such as 4 Mbit are arranged with addressing control to form, for example, 1G byte of storage. Each of the central processing units (CPU's) 15 and 17 have their own store in cache 15a and 17a. The CPUs and store-in caches (SCE) to the System Control Element (SCE) 19 which is coupled to arrays X and Y. The System Control Elements 19 connects the CPU's 15 and 17 to channel control elements (CCE) 20 and main storage arrays X and Y. The SCE 19 includes a Data Switch 21, system priority logic 22, storage protect logic 23, cross interrogate (XI) logic 24, and systems controls 25. The system priority logic 22 prioritize the requests from the CPU's 15 ,17 and (CCE) 20. The storage protect logic 23 does protect key checking to protect memory access to certain CPU's or requestors. The cross interrogate (XI) logic 24 determines where the most recent level of data resides (in main storage or a CPU's cache). The system controls 25 communicates to all of the elements in the SCE 19 to coordinate all aspects of the operation. In multiprocessor systems with the store in caches, when a CPU wants to move data it must bring the data into its cache. If a whole page of data (4K bytes) were to be transferred it would require 32 lines (each line 16 double words) to be brought into the cache. To do this would result in having to castout data in the cache, which will probably be used to make room for the paging operation. In the prior art as well as here there is a store buffer (OBB1, OBB2) 27, 28, for each CPU and store in cache. This store buffer 27,28 is used for LRU (least recently used) data being stored from the cache to make room for new data and cross interrogate (XI) castouts other requestor's wanting data held in the CPU's cache. In accordance with the present invention when the CPU's is fetching data for a page operation or any memory to memory operation, the data is loaded into this store buffer 27 or 28. This is done under expanded system control 25 via control leads 25a and 25b and switch 21. Doing this gets around the problem of loading the cache with data it doesn't need and the need for a separate paging buffer. When the data is loaded into the CPU's store buffer, then the CPU gives the SCE a command to store that data.

One way to control the store buffer would be to serialize all requests which could use it. This approach would impact system performance. The approach which was taken followed the following philosophy. Let all requests proceed in parallel and avoid conflicts when they arise. This required changes to SCE priority and XI logic.

The priority was changed to implement two new function. First, when accepting a fetch for a page operation the CPU store buffer has to be available. Second when a conflict arose for the CPU's store buffer the page operation would lose. The reason for this was as follows. Conflicts would arise when one CPU was using his store buffer for a page op, and another requestor (the CCE or other CPU) wants to get data from that cache (XI castout described above). Since the page operation is a long operation, system performance would degrade the least if the page operation was held up in priority.

The XI logic is changed to implement the following new functions. When a page operation is selected by SCE priority, XI will check if any castouts are in progress to the requesting CPU's store buffer. If a castout is in progress, XI will not service the page operation command and the page request will be placed back into SCE priority for later processing. If no castouts are in progress, XI will service the request to do paging. XI logic also ensures that no new requests will be sent to the store buffer until the store buffer is available. Another change to the XI logic was the detection of conflicting use for the CPU's store buffer (mentioned in the above paragraph). If a nonpage operation request were to cause a conflict for a CPU store buffer, XI would detect it. XI would then reschedule the request by re-writing the directory copies and sending a signal back to priority to re-enter this request. As mentioned in the above paragraph, priority will interrupt the page operation in progress to let this request proceed.

The method used of expanded storage operations, will also allow expanded to expanded storage and main-to-main storage moves in a more efficient method than used in previous systems. This is due to the fact that data can be moved without loading it into the CPU's cache.

If the memory arrays X and Y are interleaved on the cache line basis rather than between pages, the data can be kept in a buffer on the memory cards allowing more paging bandwidth, since the data would not have to be necked down to move on double word busses.

Figure 2:
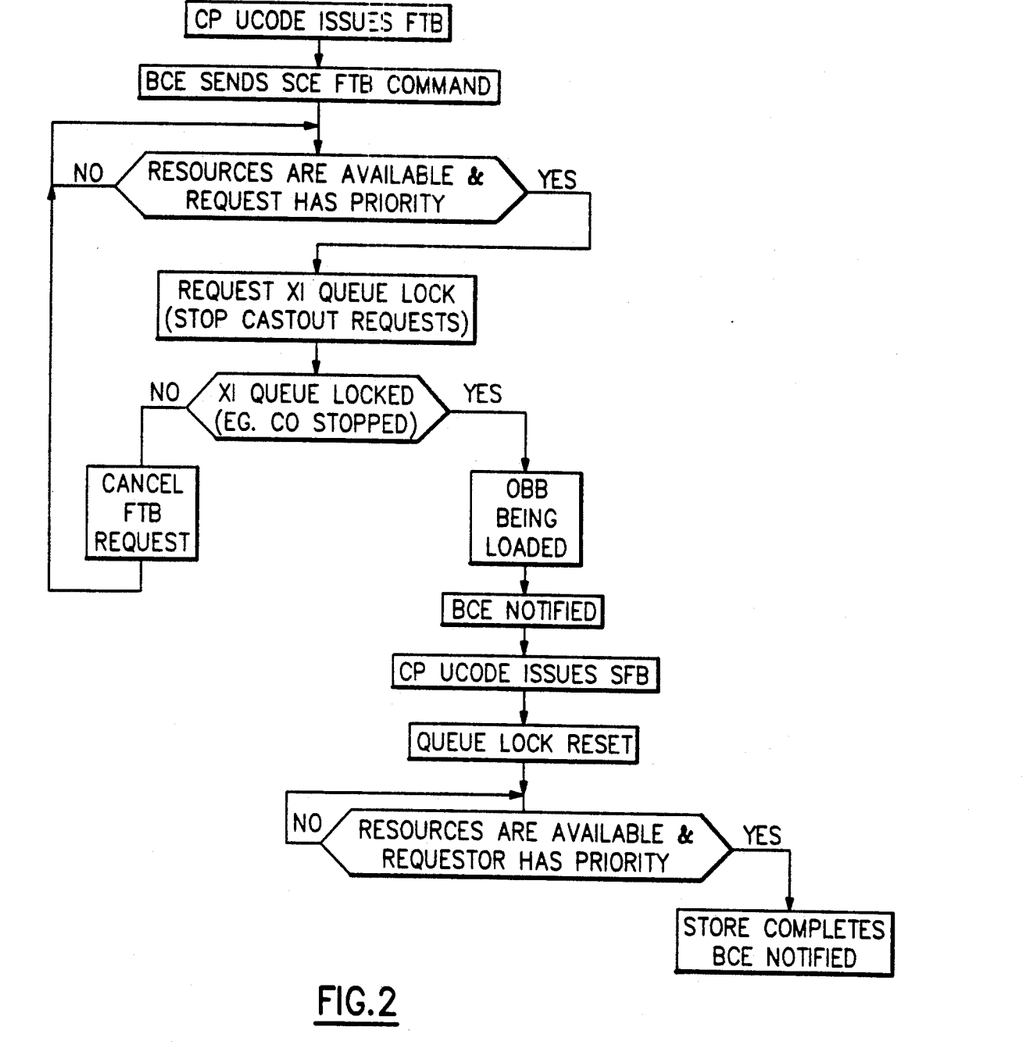
FIG. 2 is a operational flow diagram for the system of FIG. 1.

The operation of the system above follows the flow chart of FIG. 2.

Figure 3:
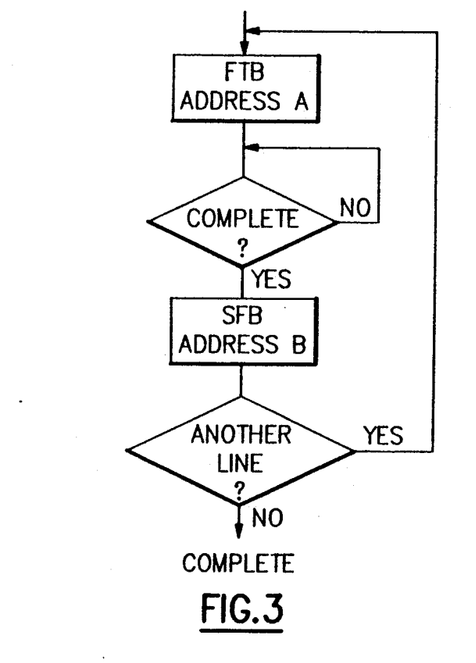
FIG. 3 is a flow chart for the microcode in the processors of FIG. 1.

The microcode in the CPU follows the flow diagram of FIG. 3 to switch from address A in main store for example to address B in expanded store.

A more detailed explanation of implementing the system described above can be achieved by modifications to the multiprocessor system of U.S. Pat. No. 4,503,497 referenced previously.

Figure 4:
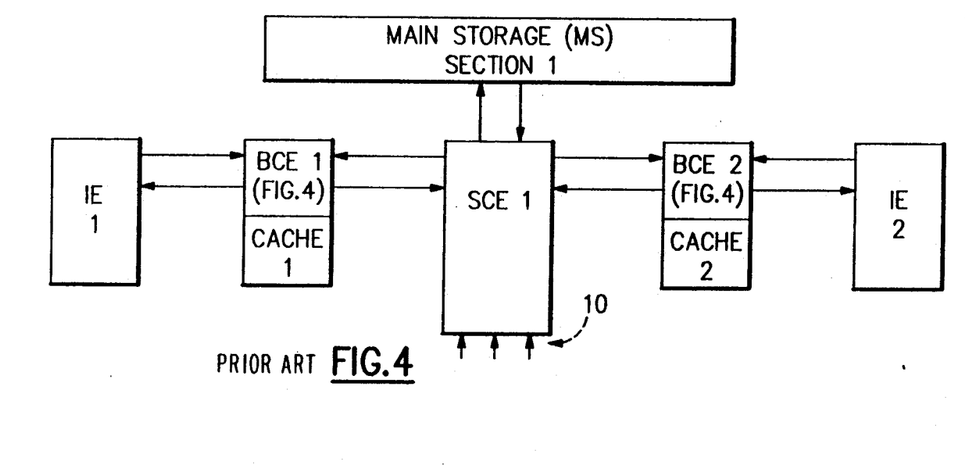
FIG. 4 illustrates the basic configuration of the prior art multiprocessor system with a store-in cache as disclosed in the referenced Krygowski et al. patent.

FIG. 4 shows the basic configuration of a two way multiprocessor system (MP). Previously, if either processor instruction element CPU 15 or 17 (IE) wanted to move data from one location storage to another, the data would be fetched into that processor's cache 15a or 17a (BCE+cache in FIG. 4. That data would then be stored back into memory.

Figure 9:
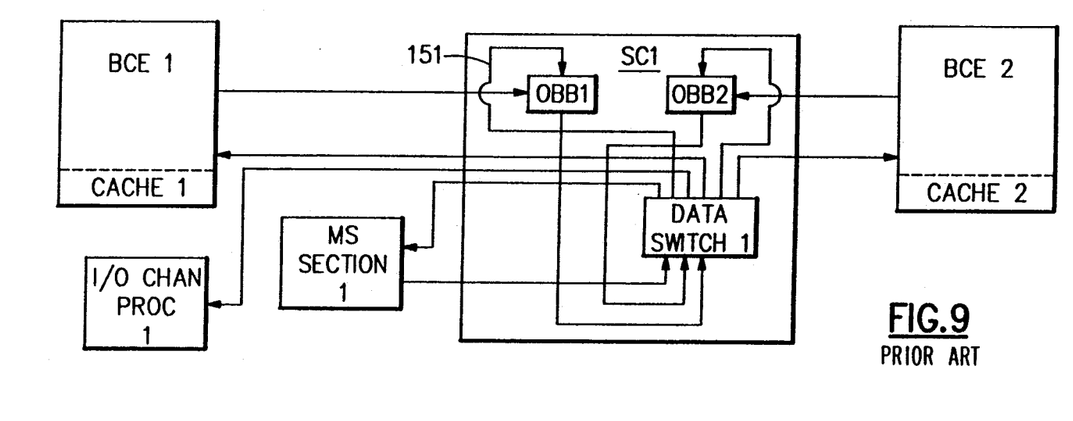
FIG. 9 illustrates modification of the diagram in FIG. 2 of the Krygowski et al patent.

The method described by this embodiment uses two simple commands to move a line of data in storage. The fetch to buffer (FTB) command is used to fetch the line of data from storage into the SCE's OBB store buffers of FIG. 9. The store from buffer (SFB) command is then used to move that line from the OBB to its new location in storage. Thus, the OBB is no longer used as only a buffer for data passing between the BCE (CPU and store in cache) and SCE. A number of control issues needs to be considered to make this work which are described later in this disclosure.

The transfer begins when the IE issues the FTB command to the BCE. Included with the request is the storage address being fetched. The processor then goes into a wait state while the BCE sends the request to the SCE. This is done using the 'SET FAR' command, along with a special modifier on the command bus indicating that this is a memory to memory line transfer. The SCE then fetches the line from memory into the OBB, and sends the BCE a 'FTB Done' response. The BCE then returns a completion response to the processor. The processor now breaks out of its wait state, and issues the SFB command, along with the address of the new memory location, to the BCE. Once again, the processor enters a wait state while the BCE forwards the request to the SCE. This is done using the 'SET STAR' command, again with a special modifier on the command bus. The SCE then moves the data from the OBB buffer to its new memory location and sends the BCE a 'SFB Done' response along with status on whether the line was successfully transferred. The BCE then sends the processor a completion response and the process is complete.

Figure 5:
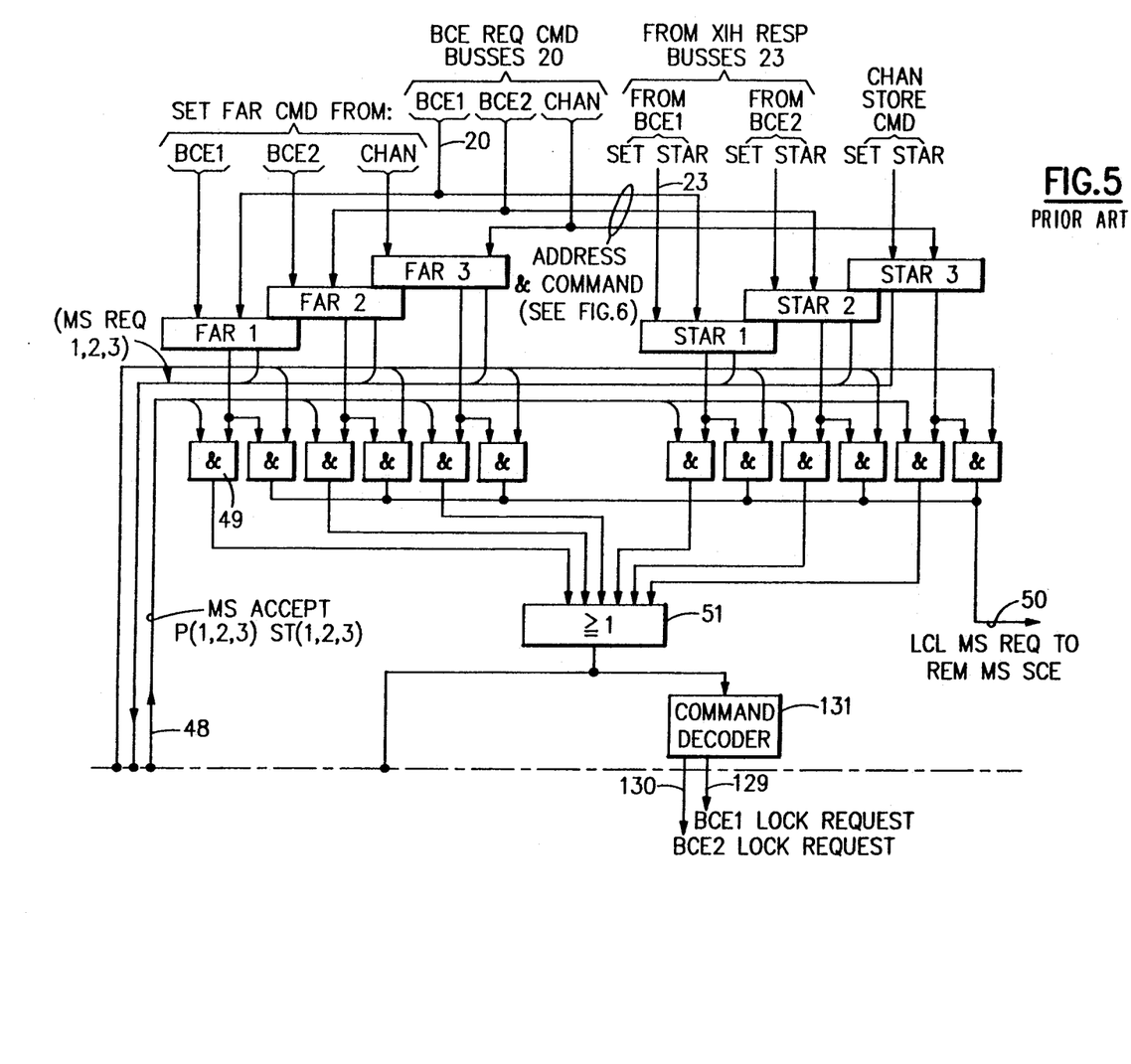
FIG. 5 illustrates modification of the SCE FAR/STAR circuits of the referenced Krygowski et al patent.

A fetch to buffer (FTB) command is loaded from a BCE into it's FAR (FIG. 5 or modified Krygowski FIG. 5a). For the FTB to be selected, it must satisfy all of the conditions for a fetch to be selected and that CPU's STAR must contain no command. If it contains a command, it's OBB would be in use (teachings of Krygowski). When the FTB is selected for servicing (via priority signaling on line 48), a BCE1 or BCE2 lock request line is generated (129) through command decoding logic 131. This line goes into the queue locking logic (this logic will be fully described in a later section). The Queue locking logic is used to stop the SCE from sending castout requests to the BCE. This is a necessary step to ensure that there will be no conflicting use of a CPU's OBB (e.g. castout and FTB at the same time).

Figure 6:
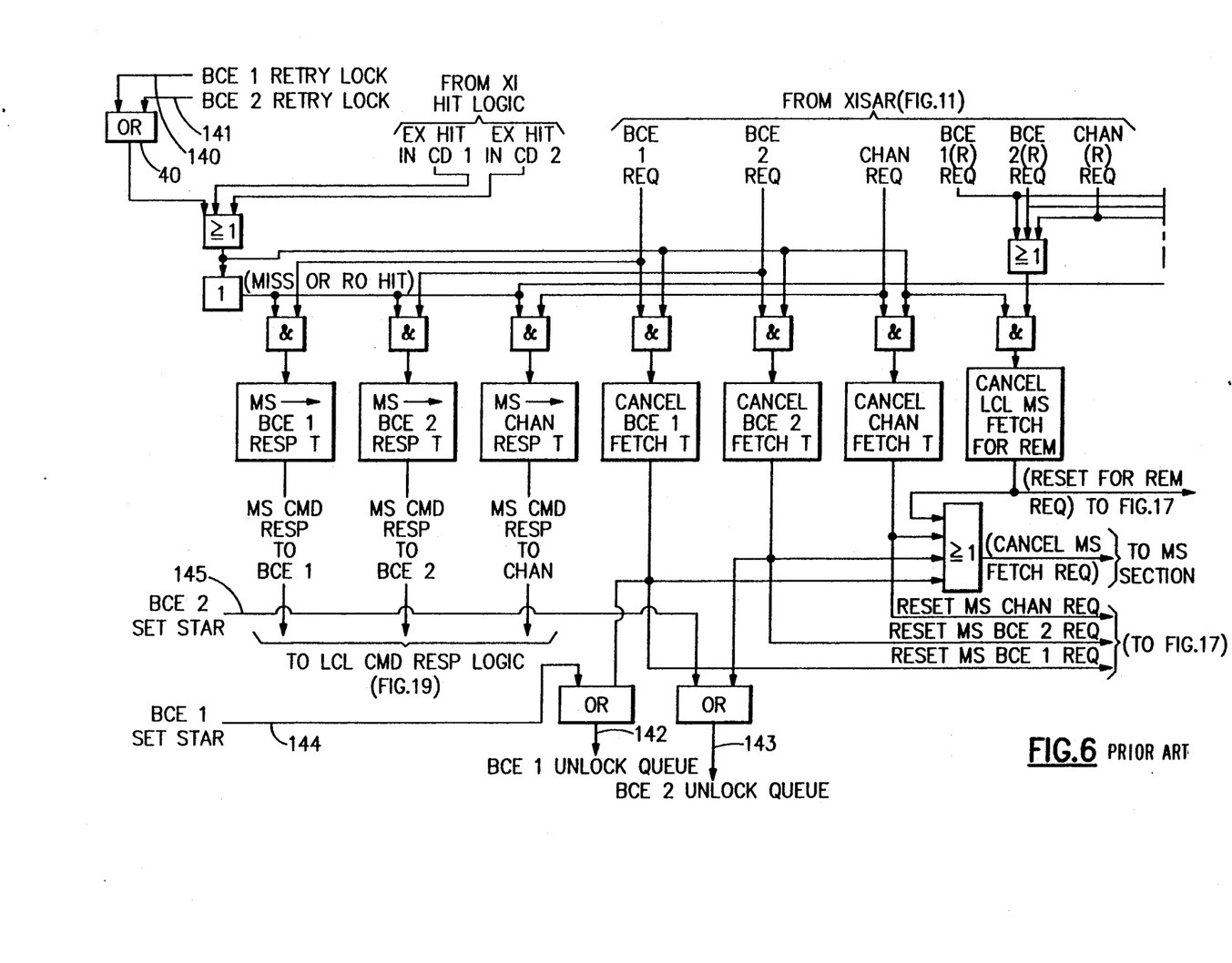
FIG. 6 illustrates modification of the cancel fetch controls diagram of FIG. 15A of the referenced Krygowski et al patent.
Figure 7:
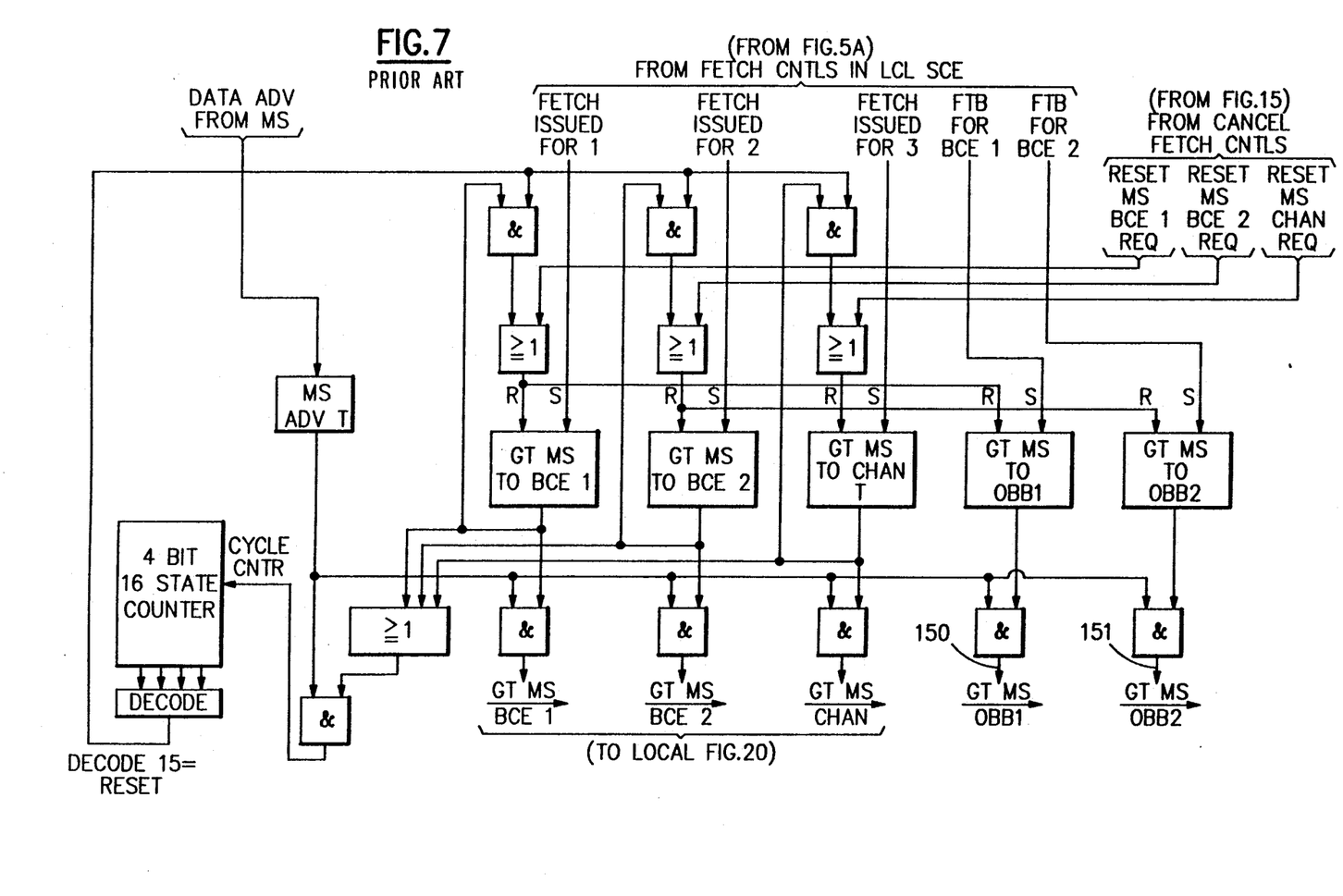
FIG. 7 illustrates modification of the diagram of FIG. 17 of the referenced Krgowski et al patent.
Figure 8:
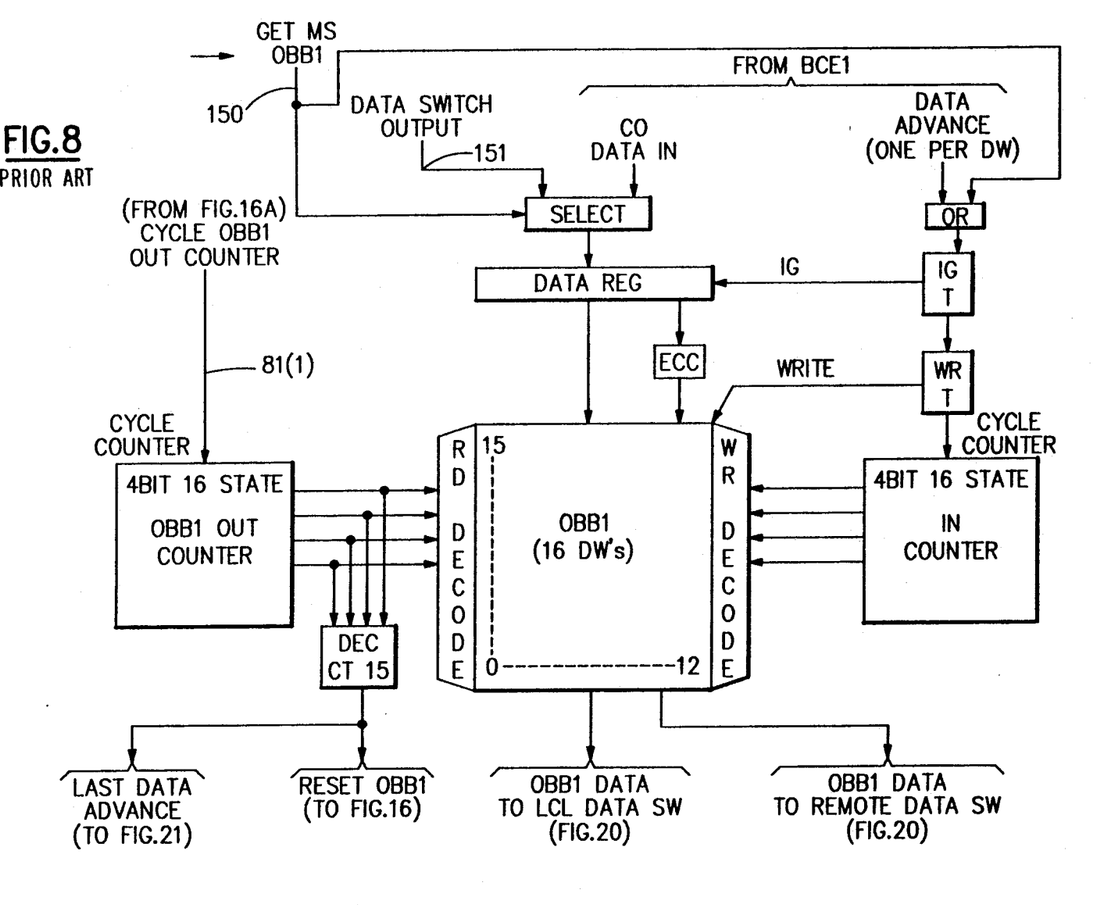
FIG. 8 illustrates modification of the diagram of FIG. 18 of the referenced Krygowski et al patent.

When a response is returned from the XI hit logic (FIG. 6 or modified Krygowski FIG. 15a), a signal BCE1 retry lock (140) for BCE1 FTB requests may be on (and BCE2 retry lock for a BCE2 FTB request). If the BCE 1 retry lock line is on, then the BCE's request is canceled and a BCE unlock queue signal is generated (142 or 143). Furthermore, the priority controls (Krygowski et al FIG. 5 block 46) are reset to redo the FTB FAR command. If the BCE1 retry lock is not on and an EX hit occurs in one of the CDs (146 or 147 FIG. 6 is Krygowski modified FIG. 15a), the following actions are taken. The BCE unlock queue signal is activated, the fetch request is canceled, and a CO & CERO is sent to the hit BCE over the XIH request bus. When the SCE gets the set STAR for the CO, it stores the line to main storage and resets the SCE priority controls to redo the FTB command. If the BCE1 retry lock is not on, then the fetch continues (note: no castout requests will be sent to the BCE1 since it's queue is locked). When data is returning from MS FIG. 7 (modified Krygowski FIG. 17), line 150 for BCE1 (151 for BCE1) is activated to gate data into the BCE's OBB. FIG. 8 (modified Krygowski FIG. 18) shows how data is gated into the OBB via the GT M.S. to OBB1 signal (150). Line 151 is the output of the data switch which gates the data from main storage (also shown in FIG. 9—modified Krygowski FIG. 2).

In parallel to the data being gated into the OBB, a command response bus (bus 21 in Krygowski et al. FIG. 6) is sent to the BCE indicating that the FTB command is complete. As described in the overview, the BCE will now issue a set STAR (FIG. 6 in Krygowski et al) with a command type indicating store from buffer (SFB). The BCE will not send any data advances to the SCE on the SFB set STAR command. The data advances come from the gate main store to OBB signal (150). Now the SCE performs the SFB the same as any store command. If a CPU in the system is holding the target line (SFB) address in it's cache, the SCE will issue an invalidate request to that line over the XIH request bus (FIG. 7 of Krygowski et al.)

An additional function of the set STAR line (145 of FIG. 6—Krygowski modified FIG. 15a) is to reset the queue locking controls for the BCE so that the SCE can resume sending castout requests to that BCE.

The BCE knows the SFB is done when his STAR becomes available to handle another set STAR command.

Figure 10:
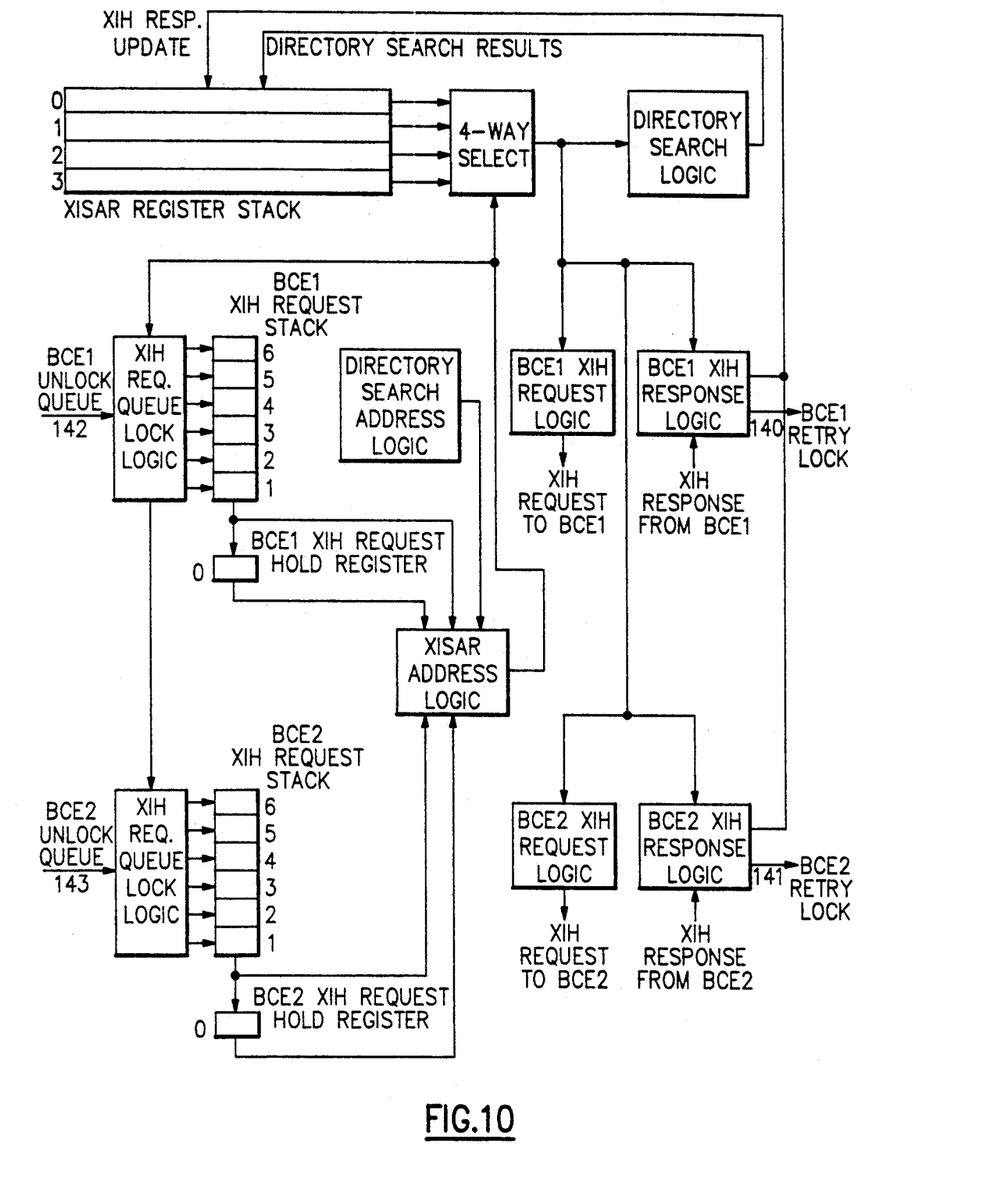
FIG. 10 illustrates XI basic logic with XI request queue lock according to the present invention.

The XI logic has a stack of 4 XISAR Registers (FIG. 10). Only one of the four registers can be accessed in any one machine cycle. The XISAR stack is accessed for three purposes. The first is to read out information to perform the search of the copy directories for the requested line of data. The second purpose is to read out information to form a XIH REQUEST to a Hit BCE. The third is to read out and update information when a RESPONSE comes back from a REQUEST to a XIH BCE. The Directory Search has priority for XISAR accesses. The other two types of accesses may occur simultaneously.

When it is determined during a Copy Directory Search that a BCE needs to have a XIH REQUEST made to it, the address of the XISAR Register being used for the Search is pushed into a FIFO stack called the XIH REQUEST STACK. Several addresses of XISAR Registers needing to send a XIH REQUEST to this BCE can be held in this stack. If the XISAR Stack Address priority logic allows the XIH REQUEST Logic to address the XISAR Register Stack, the bottom addresses in the XIH REQUEST STACK are used to access the XISAR Register stack. The information gated out of it is used to form the XIH REQUEST sent to the BCE. The XIH REQUEST STACK is pushed down with the address just used put into the XIH REQUEST HOLD REGISTER. When the BCE responds to this XIH REQUEST, the XISAR Register Stack will be accessed by the XIH REQUEST HOLD REGISTER (when the priority logic allows), the accessed XISAR Register updated and a response sent back to the requesting BCE or channel. When the XISAR Register Stack address priority logic allows it, the next address at the bottom of the XIH REQUEST STACK will be used to send out the next pending XIH REQUEST.

Figure 11A:
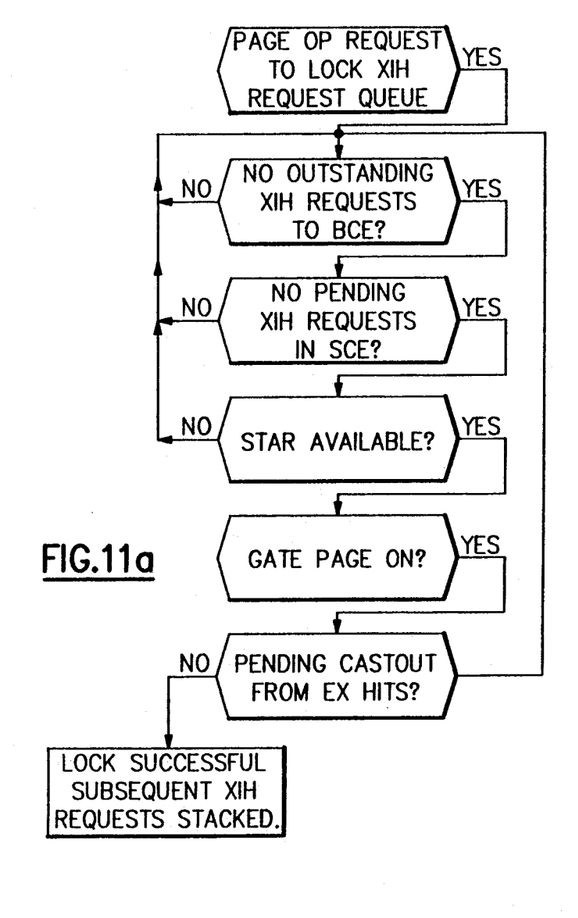
FIGS. 11a and 11b illustrate the locking mechanism logic according to the present invention.

To maintain Data Integrity in the OBB's a locking mechanism was added to the XIH Request logic (FIG. 11a). When a Copy Directory Search due to a Fetch To Buffer (FTB) starts, the XIH REQUEST STACK and HOLD REGISTER of the Search Requestor are checked to see if any XIH requests have been sent out or if are pending. If any XIH Requests are stacked for the Requesting BCE, the SCE control logic would be sent to RETRY LOCK command for that Requestor. The SCE control logic would reissue the Copy Directory Search for the FTB until the above conditions are met and the Directory Search initiated. If no XIH requests are stacked for the Requesting BCE but there is an Exclusive Hit, the XIH Request Stack is not locked and a Castout request is sent to the Hit BCE. When the Castout completes, the SCE will reissue the FTB.

Figure 11B:
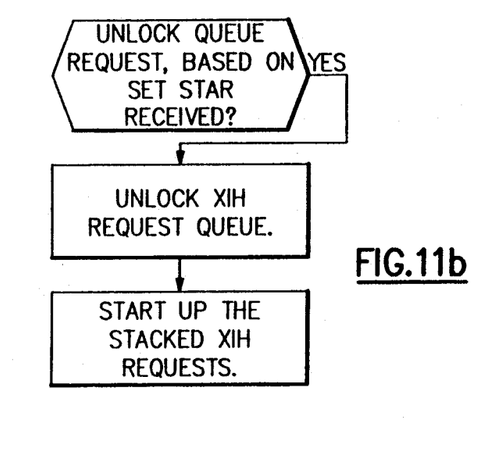

If no XIH requests are stacked and there are no Exclusive Hits on the Copy Directory Search, the XIH REQUEST STACK is locked such that addresses can be put into it but none can be taken out. This is to prevent the BCE that is requesting the FTB from being requested to do a Castout. If a Castout was allowed to occur before the Store from Buffer (SFB) part of the Storage-to-Storage Transfer was initiated, the Castout data would overwrite the FTB data residing in the OBB that is holding the data for the SFB. Once the SFB has been initiated the SCE controls issue a UNLOCK QUEUE REQUEST to allow XIH Requests that have been stacked to begin processing. (FIG. 11b)

Figure 12:
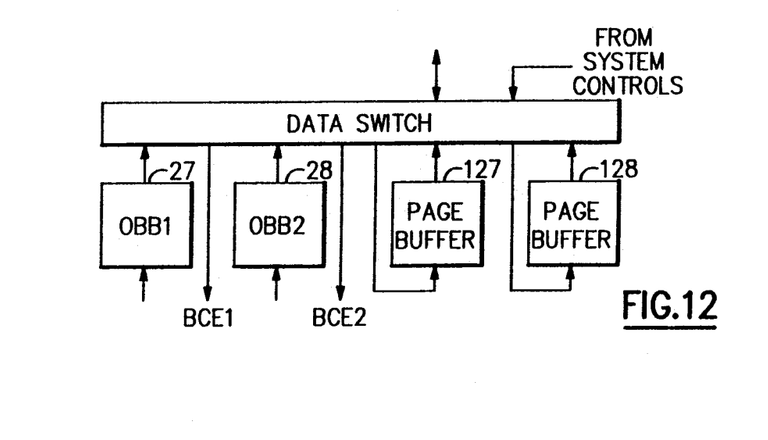
FIG. 12 illustrates another embodiment with separate dedicated store buffers for page transfers without castouts.

In accordance with another embodiment shown in FIG. 12 separate dedicated page buffers 127 and 128 are coupled to the data switch to operate as the store buffers (OBB) buffers without the BCE castout contentions and under control from the system control 25 of fetch to buffer (FTB) store from buffer (SFB).

What is claimed is:

1. A processor system enabling the transfer of data from a first location in a memory to a second location in said memory in a system which has plural processors and other elements which may request data transfer comprising:

a plurality of processors, each of which is coupled to a system memory which has physical storage which may be assigned to main and expanded memory and which provides arrays of memory locations in memory between which locations data may be transfered by a request from a processor or other elements of the system; by data transfer means for transferring data between locations of the memory;

said data transfer means including:

a processor for selectively generating a data transfer request signal for moving data from a first location in memory to a second location in memory without caching it;

a store-in cache connected between said processor and said memory for caching data under processor direction and for providing a mechanism for transfer of data from the processor to memory with a control circuitry;

said control circuitry being responsive to said data transfer request signal, said data transfer request control circuitry functioning as a data switch for routing said data through said data transfer buffer in response to said signal, while said control circuitry inhibits routing of data through said store-in cache in response to said data transfer request signal, said control circuitry including, a data switch coupled to said memory for transfering data from memory arrays in said memory through said control circuitry;

a data transfer buffer connected to said data switch and to said store-in cache for holding Least Recently Used (LRU) castouts and Cross Interrogate (XI) Castouts;

system controls coupled to said data switch for coordinating the data transfer;

system priority logic coupled to said data switch and to said system controls for prioritizing requests for transfer from the processor and any other elements of the system;

storage protect logic; and cross interogate (XI) logic including stack registers for determining whether a most recent level of data resides in the system storage or in store-in cache; said cross-interrogate logic being coupled to said store-in cache and to said system priority logic and said system controls;

said cross interrogate logic including means for locking out new castout requests until a selective requested data transfer is complete.

2. The system of claim 1 wherein said memory location is a location in a main system memory which has a a main store and an expanded storage and said first memory location is a main storage location and said second is an expanded storage location.

3. The system of claim 1 wherein said data transfer request is for a page move transfer of paging data and said data transfer buffer holds the paging data.

4. The system of claim 1 wherein said data transfer buffer is also coupled between said memory and said store-in cache, said data transfer buffer also holds Least Recently Used (LRU) castouts and Cross Interrogate (XI) castouts.

* * * * *